United States Patent [19]

Brems et al.

[11] Patent Number: 4,600,095

[45] Date of Patent: Jul. 15, 1986

[54] MECHANICAL WELDING PRESS

[75] Inventors: John H. Brems, Boca Raton, Fla.; Arthur C. Mason, Warren, Mich.

[73] Assignee: Lamb Technicon Corp., Warren, Mich.

[21] Appl. No.: 672,695

[22] Filed: Nov. 19, 1984

[51] Int. Cl.⁴ .............................................. B65G 47/00
[52] U.S. Cl. .................................. 198/346.2; 198/345
[58] Field of Search ................. 198/345, 346.2; 74/27, 74/103

[56] References Cited

U.S. PATENT DOCUMENTS

| | | | |
|---|---|---|---|
| 3,745,838 | 7/1973 | Brems | 74/27 |
| 3,789,676 | 2/1974 | Brems | 74/27 |
| 4,295,780 | 10/1981 | Wada et al. | 74/103 X |
| 4,494,282 | 1/1985 | Ida et al. | 198/345 X |

Primary Examiner—Joseph E. Valenza
Assistant Examiner—D. Glenn Dayoan
Attorney, Agent, or Firm—Barnes, Kisselle, Raisch, Choate, Whittemore & Hulbert

[57] ABSTRACT

A mechanical press has an elevated welding station and a workpiece conveyor extending through the press at a level spaced below the welding station. A lift mechanism below the conveyor is designed to elevate the platen with a straight line vertical motion in two successive steps to first engage a workpiece on the conveyor and then elevate the workpiece to the welding station. Thereafter the lift mechanism lowers the platen with a straight line vertical motion in two successive steps to first deposit the welded workpiece on the conveyor and then recede to its starting position. The drive for the lift mechanism gradually accelerates the platen at the beginning of each step and gradually decelerates it to a near zero velocity at the end of each step.

12 Claims, 11 Drawing Figures

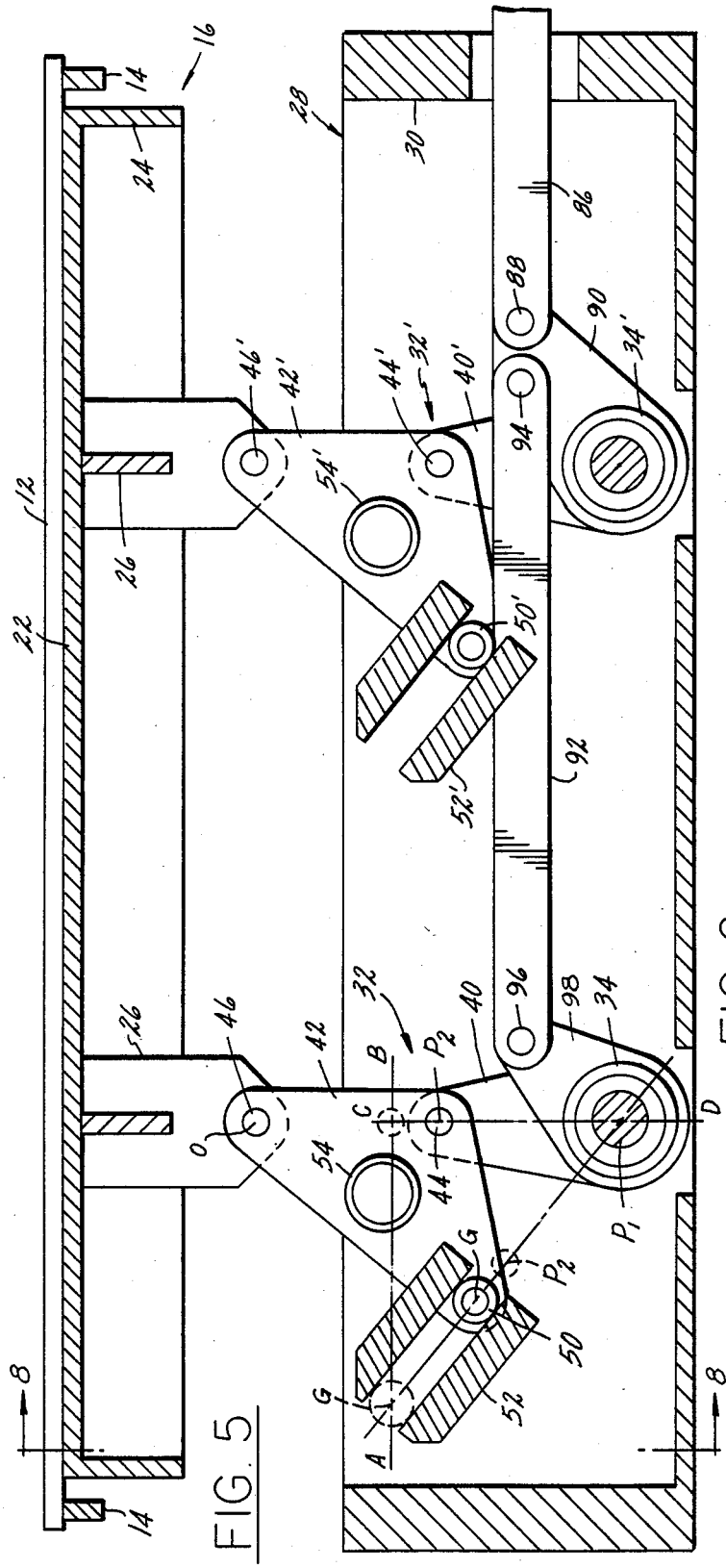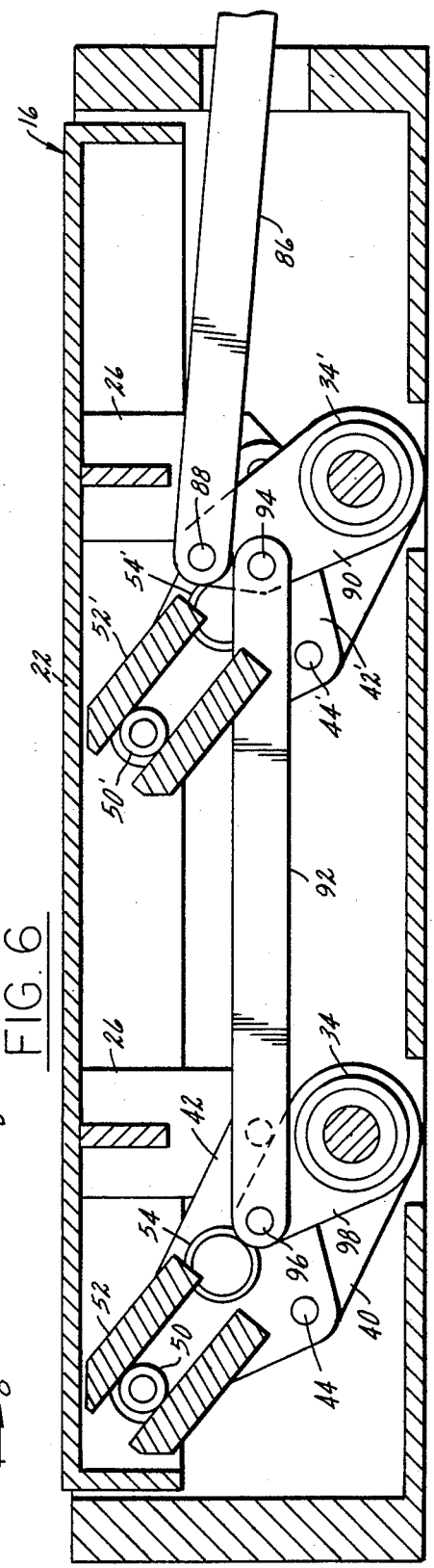

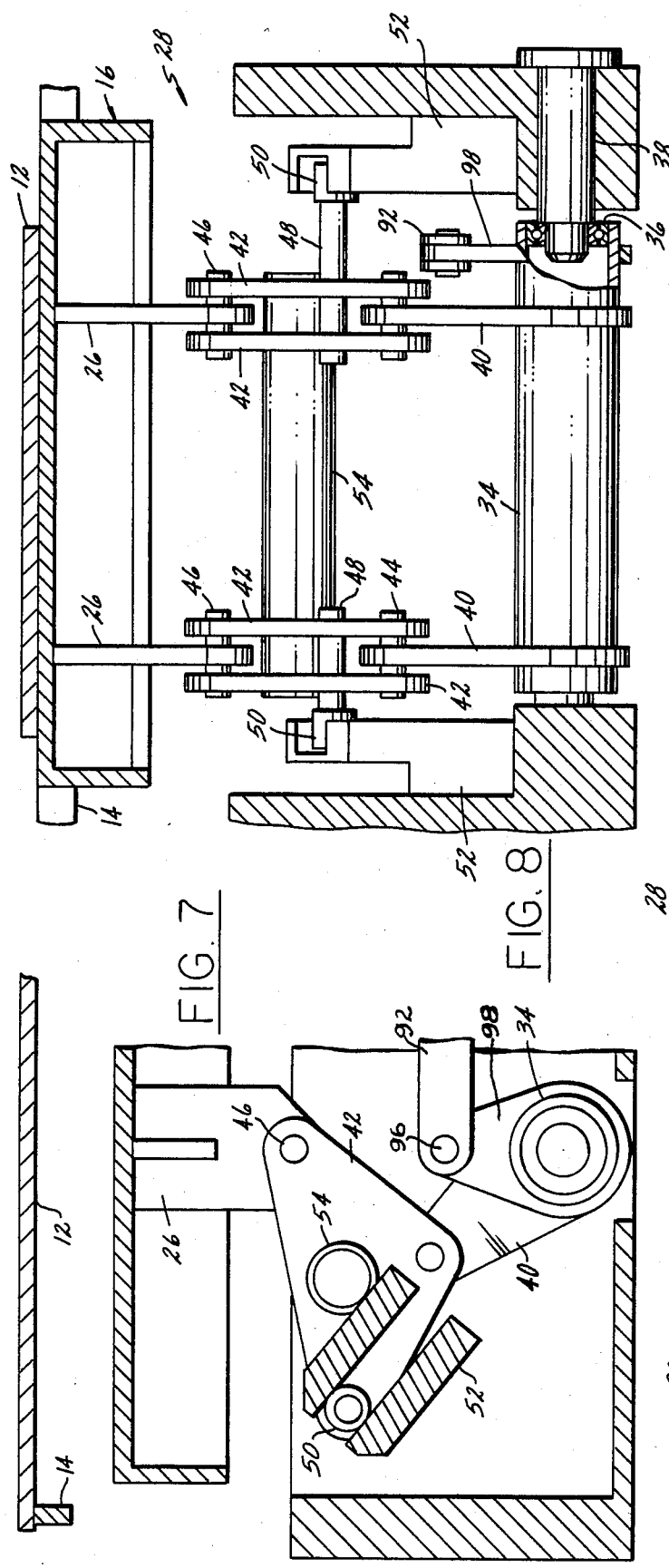

MECHANICAL WELDING PRESS

This invention relates to a mechanical welding press particularly of the type wherein workpieces are delivered to and from the press by means of a conveyor.

In one form of welding press a workpiece or an assembly of several workpieces is lifted by a lift mechanism to an elevated work station in the press where the workpieces are contacted by welding guns to make several spot welds thereon. The lift mechanism is then actuated to lower the welded assembly. In some welding presses of this type the workpieces are conveyed into and out of the press by a conveyor. With such presses the lift mechanism must first elevate to a position wherein it engages the conveyor-supported workpieces and then lifts the workpieces to the elevated welding station. After the welding operation is completed the lift mechanism must reverse its operation to first lower the welded assembly onto the conveyor and then retract to its lowermost starting position.

As a practical matter the lift mechanism should be relatively compact since it is most desirably located beneath the conveyor. In addition, it should be structurally very rigid, both laterally and vertically, in the case of a welding press, to resist the pressure of numerous welding guns. Furthermore, it should be capable of raising and lowering the workpieces in an accurate vertical path and without jarring them out of alignment with respect to the welding guns.

The primary object of the present invention is to provide a welding press with a structurally highly rigid lift mechanism which occupies a relatively small amount of space in relation to its vertical stroke and which is designed to raise and lower a workpiece between a conveyor and an elevated welding station in a vertical straight path.

A further object of this invention is to provide a lift mechanism in a press of the type described that is designed to accelerate from a rest position to a relatively high velocity and then decrease to a near zero velocity at the end of each multiple stage stroke so that it gently engages a workpiece on the conveyor and lifts it to the elevated welding station and thereafter gently deposits the welded assembly back onto the conveyor.

These and other objects, features and advantages of the present invention will become apparent from the following description and accompanying drawings, in which:

FIG. 5 is a fragmentary longitudinal sectional view of a lift mechanism according to the present invention shown in the fully raised position;

FIG. 6 is a view similar to FIG. 5 and showing the lift mechanism in the fully lowered position;

FIG. 7 is a view similar to FIG. 5 and showing the lift mechanism in the intermediate dwell position;

FIG. 8 is an end view of the lift mechanism as viewed along the lines 8—8 in FIG. 5;

FIG. 9 is a fragmentary elevational view of the lift mechanism at the drive end thereof;

Figure 1:
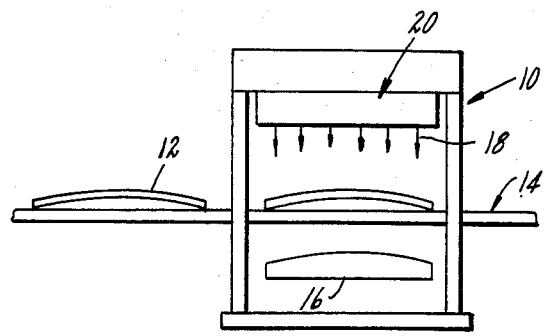
FIGS. 1, 2, 3 and 4 show in a diagrammatic way the operation of a welding press and conveyor and a workpiece lifting and lowering mechanism.
Figure 2:
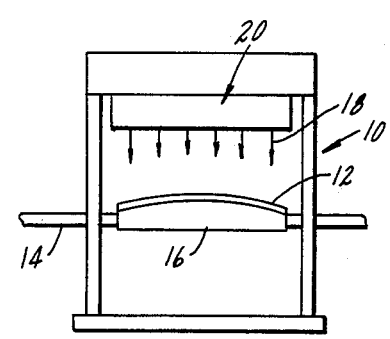
Figure 3:
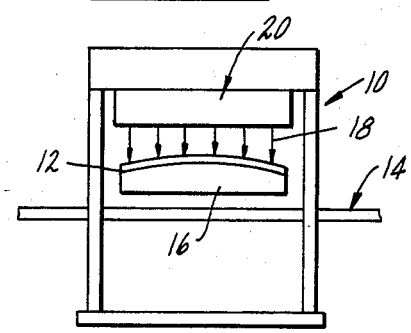
Figure 4:
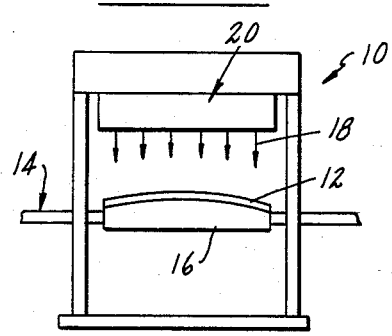
Figure 10:
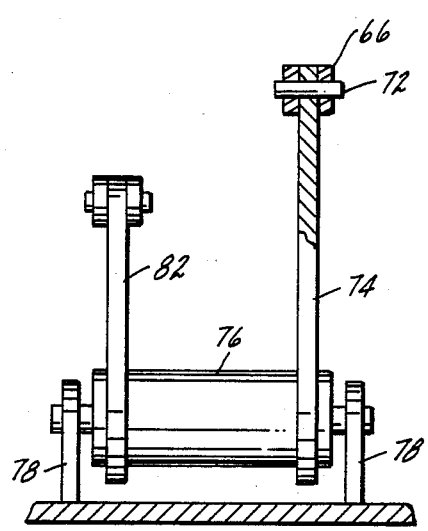
FIG. 10 is a sectional view along the line 10—10 in FIG. 9.

Referring first to FIGS. 1 thru 4, there is illustrated a welding press 10 through which workpieces 12 are conveyed one at a time by a conveyor 14. A platen or work support 16 below conveyor 14 is designed to be elevated so as to engage the workpiece 12 within the press and elevate it to a position where it is contacted by the guns 18 of a mechanical welding press assembly 20 where several spot welds will be made. In FIG. 1 a workpiece 12 is shown located on the conveyor vertically aligned with the welding assembly 20 and the platen 16. In FIG. 2 platen 16 is shown raised so as to engage the workpiece 12 on the conveyor. FIG. 3 shows the platen 16 raised to its uppermost position wherein the workpiece 12 is contacted by the welding guns 20 to effect the spot welds. Thereafter, as shown in FIG. 4, platen 16 is lowered to deposit the welded workpiece back onto the conveyor. The platen is then lowered to the position shown in FIG. 1 and the conveyor 14 is indexed to position the next successive workpiece 12 into the press and discharge the welded assembly so that the cycle can be repeated.

The platen 16 is illustrated as a work supporting plate 22 reinforced by a depending skirt 24 and having a pair of depending brackets 26 on the underside thereof. The lift mechanism for the platen is generally designated 28 and includes a base 30 on which two pair of substantially identical linkages 32,32' are arranged. As shown in FIG. 8 each linkage includes a torque tube 34 journalled for rotation on base 30 by means of bearings 36 and shafts 38. On each torque tube 34 there is fixedly mounted a pair of axially spaced parallel levers 40. A pair of axially spaced bellcranks 42 are pivotally connected to the free end of each lever 40 by the hinge pins 44. The depending brackets 26 on the underside of platen 16 are pivotally connected to each pair of bellcranks 42 as by the hinge pins 46. At the third corner of each pair of bellcranks there is mounted, as by a shaft 48, a guide roller 50 that is guided in a rectilinear path by a guide track 52 fixedly mounted one at each side of base 30. The four bellcranks 42 in each linkage arrangement 32,32' are interconnected for movement in unison by a torsion tube 54.

It will be appreciated that the arrangement of links 40,42 and the torque tubes 34,54 provides a lift mechanism that possesses a high degree of lateral stiffness. The two sets of linkages can be tied together by the two torque tubes since the links in each set do not cross over one another. This eliminates the need for vertical side guides for platen 16 which are costly and difficult to maintain in accurate alignment. In addition, the absence of side guides enables the press to accommodate larger panels than would otherwise be the case for the same size press.

Figure 11:
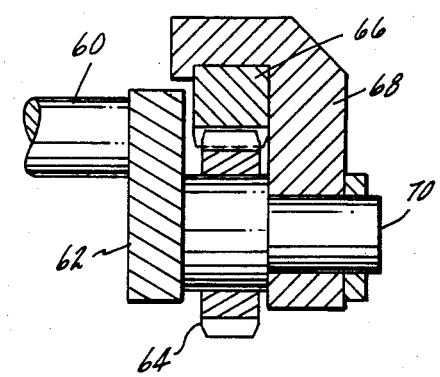
FIG. 11 is a sectional view along the line 11—11 in FIG. 9.

As shown in FIG. 9, the lift mechanism is preferably powered by a reversible electric motor 56 through a gear box 58. Referring to FIG. 11, the output shaft 60 of gear box 58 has a crank 62 mounted thereon on which is fixed a gear 64. A gear rack 66 meshes with gear 64 and is retained in engagement therewith by a bracket 68 that is journalled on the axis of gear 64 by a shaft 70. The pitch line of the teeth of gear 64 passes through the axis of output shaft 60. This arrangement is a motion generating device of the type disclosed in U.S. Pat. No. 3,789,676 which in response to rotation of output shaft 60 imparts a cycloidal motion to gear rack 66. In the position shown in FIG. 11 a slight angular displacement of shaft 60 causes little or no linear displacement of rack 66. As shaft 60 rotates through one revolution there will be a gradual acceleration of rack 66 until the maximum velocity is reached where the rack is driven by the teeth of gear 64 that are spaced a maximum distance from the axis of shaft 66. This occurs after shaft 60 has rotated through one-half revolution. Thereafter, rack 66 will gradually decelerate and its velocity will approach or become zero at one complete revolution of output shaft 60.

One end of rack 66 is pivotally connected as at 72 to a lever 74 fixed to a shaft 76 that is journalled between brackets 78 on the base 80 of the drive mechanism. A second lever 82 on shaft 76 is pivotally connected as at 84 to one end of a generally horizontally extending link 86. The other end of link 86 is pivotally connected as at 88 with a lever 90 fixed to tube 34'. Another link 92 has one end connected to lever 90 as at 94 and its opposite end pivotally connected as at 96 to a lever 98 on tube 34. In the preferred arrangement equal angular displacements are imparted to tubes 34 and 34' in response to generally horizontal displacement of link 86.

Although the above described cycloidal drive is preferred for powering the lift linkage for the platen, other non-cycloidal prime movers may be utilized. This is especially true if there is no necessity to decelerate the platen at the end of its successive motions. Examples of other usable prime movers include cranks, lead screws, cylinders, etc.

The linkages 32 and 32' are of the type disclosed in U.S. patent application Ser. No. 06/399,465, filed Oct. 19, 1982 by John Henry Brems, one of the co-inventors named herein. The linkage arrangement is designed to produce a straight line movement of the hinge pins 46,46' which interconnect the linkages with platen 16. As explained in the aforesaid application, in order to obtain such straight line motion specific design parameters of the linkages must be adherred to. The distance between the axis of pin 44 and the axis of rotation of tube 34, the distance between the axes of pins 44 and 46 and the distance between the axes of pin 44 and guide roller 50 must all be equal. In addition, the path of travel of guide roller 50 must be a straight line passing through the axis of rotation of tube 34. Furthermore, if a line drawn through the axes of roller 50 and pin 46 is horizontal when the axes of roller 50, pin 44 and tube 34 are colinear, then the path of movement of pin 46 will be vertical. This condition is shown in broken lines in FIG. 5 wherein the axis of tube 34 is designated $P_1$, the axis of pin 44 is designated $P_2$, the axis of guide roller 50 is designated G and the axis of pin 46 is designated O. When lever 40 is rotated counterclockwise from the solid line position to a position wherein the axes $P_1$, $P_2$ and G are colinear, the line A-B between the axes G and O is horizontal and the line C-D between the axes O and $P_1$ is a vertical straight line which corresponds to the path of travel of hinge pin 46.

It will be observed that the broken line position shown in FIG. 5 is an intermediate position. The solid line position of the linkage shown in FIG. 5 represents the fully raised position of platen 16 and corresponds to the position of the drive linkage shown in FIG. 9. After one revolution of the output shaft 60 of gear box 58 in a counterclockwise direction the linkage will assume the position shown in FIG. 7 wherein the platen 16 is lowered approximately one-half its full stroke and the workpiece 12 on the platen will be deposited gently at near zero velocity on the conveyor 14. After another full revolution of the output shaft 60, the platen 16 will be lowered to the fully retracted position shown in FIG. 6 which is substantially below the conveyor 14. At this time the conveyor can be operated to advance the welded assembly out of the press and to advance another panel into the press to a position directly above platen 16.

If the distances between the corresponding pivot axes in the two sets of linkages 32,32' are of exactly the same length and the inclination of the two guide tracks 52 and 52' are at the same angle, plate 16 will assume a horizontal position at all times. While such an arrangement is preferred in most instances, nevertheless, depending upon the configuration of the workpiece and the manner in which it is to be spot welded, it may be desirable to cause the plate 16 to assume a horizontal position when it engages a workpiece on the platen and to assume a somewhat inclined position when the workpiece is engaged by the guns 18 of the welding assembly 20. It will be apparent that, if the links in the linkage 32 are shorter than the corresponding links in the linkage 32', hinge pins 46 will be displaced vertically through a shorter stroke than hinge pins 46'. Likewise, if the links in the two sets of linkages are of the same size but the guide tracks 52 are inclined to the horizontal at a greater angle than the guide tracks 52', hinge pins 46 will be displaced vertically through a shorter stroke than hinge pins 46'. The vertical stroke of hinge pins 46 can also be increased or decreased in relation to the vertical stroke of hinge pins 46' by causing levers 90,98 to rotate through different arcuate extents during each of the multiple strokes of link 86. It will therefore be apparent that, although two hinge pins 46,46' are constrained to move along vertical axes, the linkages can be so designed as to cause the platen 16 to assume an inclined position throughout its vertical travel or at a predetermined location in its stroke.

The invention has been shown and described as a welding press. It is obvious that the press could be designed for other than a welding operation. This invention is applicable to various types of presses which require a workpiece to be raised from a conveyor to elevated tooling on the press. Thus, the press could be employed for sealing applications, trimming, piercing, routing or a variety of other operations customarily performed on panels and other workpieces.

We claim:

1. In a machine having a conveyor extending therethrough and a work station located vertically above a portion of the conveyor within the machine, the combination of:
   A. a vertically movable workpiece support in the machine;
   B. a lift mechanism located below the conveyor and connected with the support for lifting a workpiece from the conveyor in a substantially straight vertical path to said work station and subsequently lowering the workpiece in a reverse vertical path from the work station onto the conveyor, said lift mechanism comprising:
   1. a base,
   2. a first pair and a second pair of links longitudinally spaced apart, means rigidly connecting together the links of each pair in axially spaced apart relation, each link having a first pivot point connecting each link to said base and a second pivot point displaced from said first pivot point by a first distance,
   3. a first pair and a second pair of bell cranks longitudinally spaced apart, means rigidly connecting together the bell cranks of each pair in axially spaced apart relation, each bell crank connected with one associated link, each bell crank having three triangularly related pivot points thereon comprising:
  (a) a center pivot point connected with its respective link at said second pivot point,
  (b) a guide pivot point spaced from said center pivot point by a second distance, and
  (c) an output pivot point spaced from said center pivot point by a third distance and connected with said support,
said pivot points permitting relative pivotal movement of the links and bell cranks about generally horizontally extending parallel axes, the triangles defined by the three pivot points on the bell cranks of each pair being similar triangles, the distances on each of the connected links and bell cranks of each pair between the first and second pivot points, between the second and guide pivot points and between the second and output pivot points being substantially equal,
  4. a first pair and a second pair of guides longitudinally spaced apart on said base for guiding each associated guide pivot point along a straight line passing through the pivot axis of the first pivot point and inclined to the horizontal at an angle such that when each link is pivoted to a position wherein the first, second and guide pivot points lie in said straight line, a line extending between said first pivot point and said output pivot point is substantially perpendicular to the horizontal; and
  5. drive means for pivoting said first and second pairs of links in unison and alternately in opposite angular directions.

2. The combination called for in claim 1 wherein the spacing between the corresponding pivot points on the two links and bellcranks of both the first and second pair are substantially equal.

3. The combination called for in claim 1 wherein the pivot guides of both the first and second pair are inclined to the horizontal at substantially the same angle.

4. The combination called for in claim 3 wherein all of the guides are substantially parallel to each other.

5. The combination called for in claim 4 wherein all of the links are rotated in the same directions.

6. The combination called for in claim 1 wherein said means for rotating the links are designed to pivot the links through two successive steps of equal extent, first in one direction and then in the opposite direction, with an accelerating-decelerating motion at the beginning and end of each step, the extent of pivotal motion of each link during each step being determined such that the support is located below the conveyor at the beginning of the first step and at the end of the fourth step at a level closely approaching or contacting a workpiece on the conveyor at the end of the first step and at a level wherein the workpiece is disposed at said work station at the end of the second step.

7. The combination called for in claim 6 wherein the two links of each pair are rotated through the same arcuate extent in each step.

8. The combination called for in claim 6 wherein said workpiece support extends horizontally, the spacing between the corresponding pivot points on all the links and bellcranks are exactly equal, all the links and bellcranks have exactly the same orientation, all the guides are parallel and all the links are pivoted through the same arcuate extent and in the same direction during each step.

9. The combination called for in claim 1 wherein said work station comprises a welding press assembly.

10. The combination called for in claim 1 wherein said means for pivoting the links produces a near zero velocity at the end of each successive step.

11. The combination called for in claim 1 wherein the links of each pair are rigidly connected together by a torgue tube extending between them and the bell cranks of each pair are rigidly connected together by a torque tube extending between them.

12. In a machine having a conveyor extending therethrough and a work station located vertically above a portion of the conveyor within the machine, the combination of:
  A. a vertically movable workpiece support in the machine;
  B. a lift mechanism located below the conveyor and connected with the support for lifting a workpiece from the conveyor in a substantially straight vertical path to said work station and subsequently lowering the workpiece in a reverse vertical path from the work station onto the conveyor, said lift mechanism comprising:
  1. a base,
  2. at least one first link and at least one second link longitudinally spaced apart, each link having a first pivot point connecting each link to said base and a second pivot point displaced from said first pivot point by a first distance,
  3. at least one first bell crank and at least one second bell crank longitudinally spaced apart, each bell crank connected with one associated link, each bell crank having three triangularly related pivot points thereon comprising:
    (a) a center pivot point connected with its respective link at said second pivot point,
    (b) a guide pivot point spaced from said center pivot point by a second distance, and
    (c) an output pivot point spaced from said center pivot point by a third distance and connected with said support,
  said pivot points permitting relative pivotal movement of the links and bell cranks about generally horizontally extending parallel axes, the triangles defined by the three pivot points on all of the first bell cranks and all of the second bell cranks being similar triangles, the distances on each of the connected links and associated bell cranks between the first and second pivot points, between the second and guide pivot points and between the second and output pivot points being substantially equal,
  4. at least one first guide and at least one second guide longitudinally spaced apart on said base for guiding each associated guide pivot point along a straight line passing through the pivot axis of the first pivot point and inclined to the horizontal at an angle such that when each link is pivoted to a position wherein the first, second and guide pivot points lie in said straight line, a line extending between said first pivot point and said output pivot point is substantially perpendicular to the horizontal; and
  5. drive means for pivoting all of said first and second links in unison and alternately in opposite angular directions.

* * * * *